United States Patent [19]

Bezrutczyk

[11] 3,885,755

[45] May 27, 1975

[54] PORTABLE SOLDERING FIXTURE

[76] Inventor: Dominic S. Bezrutczyk, 286 Lawlor St., New Britain, Conn. 06051

[22] Filed: Jan. 9, 1974

[21] Appl. No.: 431,921

[52] U.S. Cl. .............................................. 242/129.5
[51] Int. Cl. ......................... B65h 49/00; D01h 7/16
[58] Field of Search ..... 242/55.2, 55.42, 129, 129.5

[56] References Cited

UNITED STATES PATENTS 2,562,923 8/1951 Kolivoski .......................... 242/55.2

*Primary Examiner*—Leonard D. Christian

[57] ABSTRACT

A fixture is provided which is particularly adapted for supporting thereon a coil of solder wire. The fixture includes a base which functions as the support for the fixture and a coil support operatively connected to the base on which the coil of solder wire is received. In accord with one form of the invention, an elongated shaft which is threaded at both ends is mounted on the base so as to extend outwardly therefrom at right angles thereto. For this purpose, one of the threaded ends of the shaft is passed through an opening provided therefor in the base and is secured in position by means of a nut which is threadedly engaged on the aforesaid one of the threaded ends of the shaft. Intermediate the ends thereof the shaft is provided with a shoulder which functions as a support for a bearing which rests thereagainst and a plate which in turn bears against the bearing. The coil support is mounted on the shaft so as to be in abutting engagement with the plate and is retained so positioned through the use of a washer and a cap nut, the latter being threadedly engaged with the other threaded end of the shaft after the washer has been positioned thereon. With the fixture so assembled, the coil of solder is placed on the fixture with the coil support thereof extending into the hollow interior of the coil. In accord with another form of the invention, the shaft has a L-shaped configuration and the coil support is mounted thereon so that the major axis of the coil support lies in a plane parallel to the principal plane of the base. In addition, the coil support is provided with spring means operable for inhibiting relative movement between the coil support and a coil of solder wire supported thereon.

7 Claims, 4 Drawing Figures

PORTABLE SOLDERING FIXTURE

BACKGROUND OF THE INVENTION

As is well-known, there has been an increasingly widespread use made of printed circuit boards in the electrical industry in recent years. Most often, it is found that the electrical devices which are presently being developed as well as many of those which were developed in the recent past have been designed to embody printed circuits consisting of solid state components which are mounted on a printed circuit board. The reason for this increased interest in the use of printed circuits stems primarily from the fact that there are numerous advantages which have been recognized as flowing from the employment of printed circuits as compared to the previous use of what had been heretofore considered to be the more conventional forms of electrical components such as tubes, etc.

In this connection, it has become more and more the prevalent practice when a malfunction occurs in one of the components mounted on the printed circuit board to replace the entire printed circuit board with another one. This practice has been found to produce economies based on a comparison of the cost involved in merely substituting one printed circuit board for another, as measured by the charge for labor to do so and the cost of a new printed circuit board versus the total cost involved in replacing only the malfunctioning component with a new one. Namely, in the latter case the total cost involved in this instance is the charge for the repairman's time in detecting exactly which one of the components on the printed circuit board is malfunctioning, removing the latter component from the printed circuit board, replacing the malfunctioning component with a new one, hard wiring the new component to the printed circuit board, as well as the cost of the new part, i.e., component. More particularly, it has been found that the charge for labor represents the significant portion of the total cost involved in replacing one malfunctioning component with another and thereby by minimizing the total time that is required on the part of the repairman to correct the malfunction it is possible to achieve monetary savings.

Notwithstanding the fact that printed circuit boards possess various operating advantages, one disadvantage thereof lies in the fact that the components mounted on the printed circuit board must be hard wired thereto. This is in contrast to the use of plug-in connections, etc. by means of which tubes, etc. are conventionally connected in an electrical circuit. Most often, the hard wiring is done by soldering the terminals of the components to the printed circuit board. The latter is provided on at least one surface thereof with a plurality of conductive paths whereby when the terminals of the components are soldered thereto function to provide a particular printed circuit.

A major portion of the cost involved in the manufacture of printed circuits consists of the cost of labor in assembling the components on the printed circuit board. The small size of the components and the need to solder the terminals thereof to the printed circuit board makes the tasks of manufacturing a printed circuit a tedious one. It has been found that the longer the person making the soldering connections works, the more fatigued the person becomes. This fatigue often manifests itself in the frequent misplacement of solder wire.

As is well-known, solder wire is commonly provided in the form of a coil. Consequently, rather than continually having to handle the coil, the worker generally finds it more desirable to break off a length of solder wire from the coil and employ the latter to make a number of soldering connections. The result has been that a significant amount of solder wire is commonly wasted, both as a result of the piece of solder wire being misplaced when the worker puts it down to pick up another component the terminals of which are to be soldered to the printed circuit board as well as from the fact that it is impossible to utilize the entire piece of solder wire for making soldering connections because of the need to grasp a portion of the solder wire to hold it in position while heat is applied to the end thereof in accord with conventional soldering techniques.

Notwithstanding the fact that fixtures of various types have long been known in the prior art, little interest has been directed to providing a fixture particularly adapted to be employed for purposes of supporting a coil of solder wire during the making of soldering connections. More particularly, a need has existed to provide such a fixture for supporting a coil of solder wire which would be capable of being utilized in industrial applications, i.e., in the environment of a manufacturing plate. Moreover, such a soldering fixture should be of relatively simple construction, yet be characterized by the fact that it provides a relatively long operating life during which a minimum amount of maintenance is required. Finally, the soldering fixture should be relatively inexpensive to manufacture whereby to enable each worker who is required to make soldering connections to be provided with his own individual soldering fixture.

Accordingly, it is an object of the present invention to provide a novel and improved fixture particularly adapted to be employed to support thereon a coil of solder wire while soldering connections are being made.

It is another object of the present invention to provide such a fixture for a coil of solder wire which facilitates the task of the production worker in the soldering of small components and printed circuit boards.

A still further object of the present invention is to provide such a fixture for a coil of solder wire which will help in lessening the fatigue of the worker.

Still another object of the present invention is to provide such a fixture for a coil of solder wire which will help to obviate the misplacement of solder wire during production.

Yet another object of the present invention is to provide such a fixture for a coil of solder which in savings of solder wire along provided thereby is capable of paying for itself in a relatively short time.

Yet still another object of the present invention is to provide such a fixture for a coil of solder wire which is inexpensive to manufacture, compact in construction, and is designed for portability.

SUMMARY OF THE INVENTION

It has now been found that the foregoing and related objects can be readily attained in a fixture which is particularly adapted for supporting thereon a coil of solder wire while soldering connections are being made. The fixture includes a base which functions as a support for the fixture. There is provided a shaft one end of which is mounted to the base. At the other end thereof, the shaft is suitably dimensioned so as to enable a coil support to be received thereon. The latter coil support is operable for receiving thereon a coil of solder wire which is supported so as to permit relative movement between the coil of solder wire and the shaft. Means comprising a washer and a cap nut, the latter being threadedly engageable with the threaded free end of the shaft are utilized for purposes of securing the coil support in position on the shaft. With a coil of solder wire positioned on the fixture, the manner of use thereof merely requires the worker to uncoil as much of the solder wire as he needs to reach the point where the solder connection is to be made. As he works, the worker simply continues to uncoil as much solder wire as he needs. When he is finished soldering, the worker merely recoils the loose end of solder wire back on the coil until the next time there is need therefor.

In accord with the preferred form of the invention, the fixture includes an elongated shaft which is threaded at both ends. The shaft is mounted on the base so as to extend at right angles thereto. One of the threaded ends of the shaft is passed through an opening provided therefor in the base and is secured in position by means of a nut which is threadedly engaged on the aforesaid one of the threaded ends of the shaft. Intermediate the ends thereof, the shaft is provided with a shoulder which functions as a support for a bearing which rests thereagainst and a plate which in turn bears against the bearing. The coil support is mounted on the shaft so as to be in abutting engagement with the plate and is retained so positioned through the use of the aforementioned washer and cap nut. With the fixture so assembled, the coil of solder is placed on the fixture with the coil support thereof extending into the hollow center of the coil.

In accord with another embodiment of the invention, the shaft is generally L-shaped in configuration and is mounted on the base so as to have a first portion thereof which is attached to and extends at right angles to the base, and a second portion which lies in a plane which is parallel to the principal plane of the base. The second portion of the shaft intermediate the ends thereof is provided with a shoulder which functions as a stop for the coil support when the latter is mounted on the shaft. Preferably, a washer is interposed between the shoulder and the coil support whereby the coil support bears against the washer. The previously referred to washer and cap nut are received on the free end of the second portion of the shaft after the coil support has been received thereon to retain the coil support in position on the shaft yet permit relative movement to occur between a coil of solder wire positioned on the coil support and the shaft. In addition, the coil support is preferably provided with spring means operable for inhibiting relative movement between the coil support and a coil of solder wire supported thereon.

DETAILED DESCRIPTION OF THE ILLUSTRATED EMBODIMENTS

Figure 1:
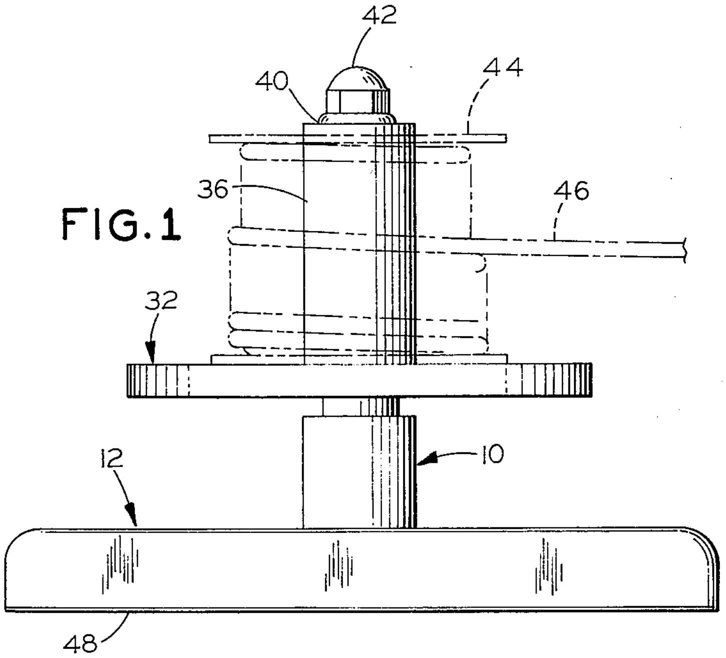
FIG. 1 is a side elevational view of one embodiment of a fixture for a coil of solder wire constructed in accordance with the present invention, illustrating in phantom lines the manner in which a coil of solder wire is supported thereon.
Figure 2:
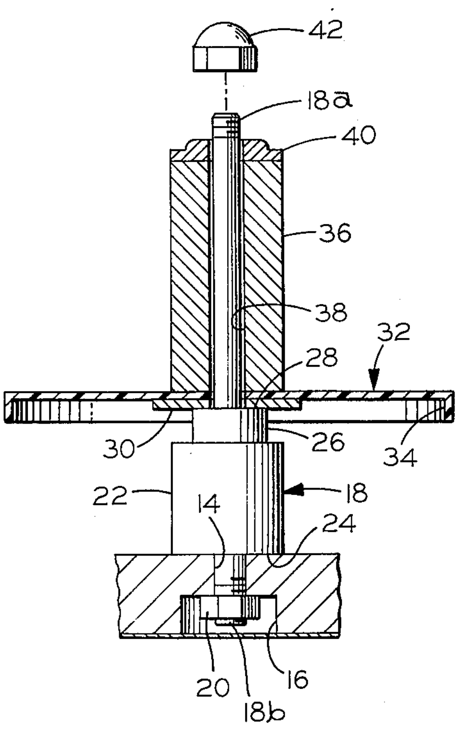
FIG. 2 is a cross-sectional view of the embodiment of fixture for a coil of solder wire shown in FIG. 1 constructed in accordance with the present invention, illustrated with parts broken away and with parts exploded for purposes of clarity of illustration.
Figure 3:
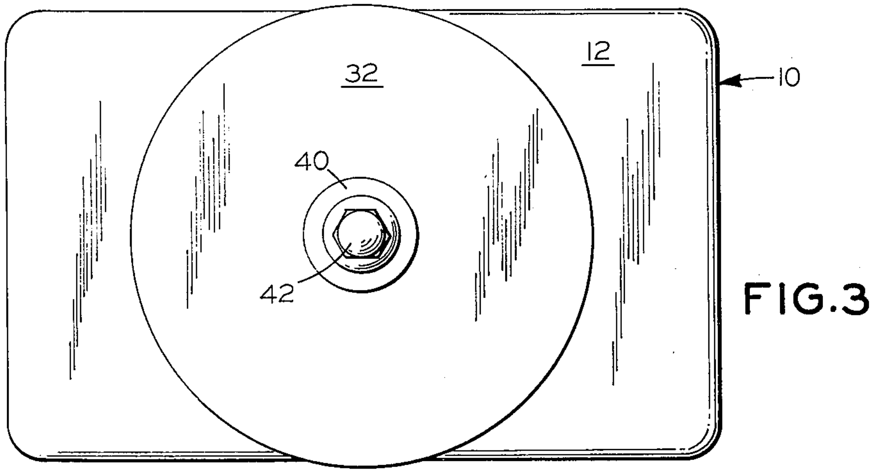
FIG. 3 is a top plan view of the embodiment of fixture for a coil of solder wire of FIGS. 1 and 2 constructed in accordance with the present invention.

Referring now to the drawings and more particularly FIG. 1 thereof, there is illustrated therein one embodiment of a fixture, generally designated by reference numeral 10, constructed in accordance with the present invention which is particularly adapted to be employed to support a coil of solder wire during soldering operations. The fixture 10 includes a base 12 which is best seen with reference to FIG. 3 of the drawings is preferably provided with a polygonal-shaped configuration. The base 12 functions as a support for the fixture 10. It is, of course, to be understood that the base 12 could take some other shape if so desired. In this regard, irrespective of what shape the base 12 has, the important consideration is that the base 12 be sufficiently heavy to provide a stable support, i.e., to prevent the fixture 10 from tipping over when solder wire is being uncoiled from the coil of solder wire supported on the fixture 10 in a manner which will be described subsequently. Substantially at the center thereof as shown in FIG. 2 of the drawings, the base 12 is provided with an opening 14. In addition, in the bottom surface of the base 12 surrounding the opening 14 there is provided a recessed portion 16 for a purpose yet to be described.

Referring again to FIG. 2 of the drawings, the fixture 10 includes a shaft 18 which is preferably threaded at each end 18*a* and 18*b*, respectively. The end 18*b* of the shaft 18 is suitably dimensioned so as to be receivable in the opening 14 provided therefor in the base 12 of the fixture 10. The shaft 18 is mounted on the base 12 so as to extend outwardly therefrom substantially at right angles to the principal plane of the base 12. The shaft 18 is retained in the aforedescribed mounted condition by means of a nut 20 which is threadedly engaged on the end 18b of the shaft 18 and tightened thereon. As depicted in FIG. 2 of the drawings, the recessed portion 16 formed in the bottom surface of the base 12 is suitably dimensioned to enable the threaded end 18*b* of the shaft 18 and the nut 20 provided thereon to be received within the recessed portion 16.

In accord with one mode of construction, the shaft 18 comprises an elongated member the original diameter of which is as shown in the portion thereof designated by the reference numeral 22. Thus, a shoulder 24 is provided between the portion 22 and the end 18b of the shaft 18. Moreover, the ends of the shaft 18 are turned down to form the ends 18a and 18b thereof which are thereafter threaded. Intermediate the ends 18a and 18b thereof and adjacent to the portion 22, the shaft 18 is provided with a portion 26 of reduced diameter, the latter being operable to provide a second shoulder 28 for a purpose which will be described susequently. As best understood with reference to FIG. 2 of the drawings, the diameter of the portion 22 of the shaft 18 exceeds the diameter of the opening 14 formed in the base 12 whereby when the end 18*b* of the shaft 18 is received in the opening 14, the shoulder 24 functions as a stop limiting the extent to which the end 18*b* of the shaft 18 projects through the opening 14 and thereby ensuring that shaft 18 and the nut 20 carried thereon do not project out of the recessed portion 16. Instead of employing the aforedescribed mode of construction, it is, of course, however to be understood that the shaft 18 could also if so desired take the form of a plurality of independent members, i.e., the portions 22 and 26 could comprise separate elements which are suitably retained on the shaft 18 in the position depicted in FIG. 2 through the use of conventional securing means such as for example, through the use of set screws, and with the shaft 18 being provided along its entire length with a diameter substantially equal to that of the ends 18a and 18b thereof.

With reference further to FIG. 2 of the drawings, the shoulder 28 functions as a support for a bearing 30 of conventional construction. The bearing 30 provides a bearing surface for a circular plate 32. The latter plate 32 is preferably made from a suitable plastic and is provided with a depending flange 34. A coil support 36, comprising a cylindrical member having a hole 38 formed through the center thereof is positioned on the shaft 18 whereby one end of the coil support 36 rests on the plate 32. For purposes of retaining the coil support 36 positioned on the shaft 18, means comprising a washer 40 and a cap nut 42 are preferably employed. More particularly, after the coil support 36 has been placed on the shaft 18, the washer 40 is positioned on the shaft 18 and thereafter the cap nut 42 is threadedly engaged on the end 18a of the shaft 18 and is tightened thereon.

After the fixture 10 has been so assembled, a coil 44 of solder wire 46 is mounted on the fixture 10 whereby the coil 44 rests on the plate 32 in the manner depicted in phantom lines in FIG. 1 of the drawings. For this purpose, the coil 44 is provided with a hollow interior (not shown) suitably dimensioned so as to enable the coil support 36 to be inserted therewithin. With the coil 44 of solder wire 46 positioned on the fixture 10, the manner of use thereof is such that a worker merely has to uncoil the length of solder wire 46 which he needs to perform the soldering connection. As he works, the worker simply continues to uncoil the soldering wire 46 as he needs it. When he is finished with the solder wire 46, the worker merely recoils on the coil 44 the solder wire 46 which remains unused thereby eliminating any waste thereof. Moreover, since the solder wire 46 is not broken off from the coil 44, there is no danger of it becoming misplaced.

It will best be understood with reference to FIG. 2 of the drawings that the construction of the fixture 10 is such that the coil support 36 as well as the plate 32 are capable of movement relative to the shaft 18. Completing the description of the fixture 10, the bottom surface of the base 12 thereof is preferably provided with a layer of covering material 48 such as for example, a conventional felt pad which is operable to prevent the fixture 10 from marring the surface of a workbench, etc. upon which the fixture 10 may be positioned during the use thereof.

Figure 4:
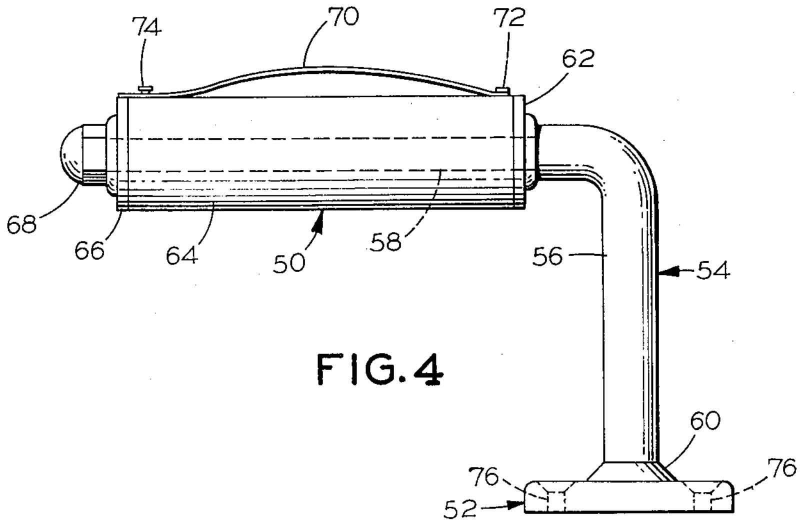
FIG. 4 is a side elevational view of another embodiment of fixture for a coil of solder wire constructed in accordance with the present invention.

Turning next to FIG. 4 of the drawings, there is illustrated therein another embodiment of a fixture, generally designated by reference numeral 50, constructed in accordance with the present invention, which is particularly adapted to be employed to support thereon a coil of solder wire. The fixture 50 includes a base 52 which essentially may have any configuration desired but which in accord with the preferred form thereof is polygonal in shape. Mounted on the base 52 in a manner yet to be described, there is provided a generally L-shaped shaft 54 consisting of a first portion 56 integrally interconnected to a second portion 58 whereby a right angle is formed therebetween. The shaft 54 may be mounted on the base 52 in any suitable manner operable to cause the first portion 56 of the shaft 54 to extend at right angles to the base 52 and with the second portion 58 of the shaft 54 lying in a plane parallel to the principal plane of the base 52. In this connection, the free end of the first portion 56 of the shaft 54 is preferably threaded in a manner similar to the end 18b of the shaft 18 of the fixture 10, and is passed through a suitably dimensioned opening (not shown) provided therefor in the base 52 and has a nut (not shown) threadedly engaged therewith and tightened in position thereon. In accord with the illustrated embodiment, the base 52 is preferably provided with a conical-shaped portion 60 formed integrally therewith so as to project outwardly from the upper surface thereof. The portion 60 performs a dual function. First, it provides additional support for the end of the shaft 54 which is mounted on the base 52. Secondly, it provides a larger hollow area in the base 52 wherein the end of the first portion 56 of the shaft 54 which projects outwardly of the opening (not shown) provided therefor in the base 52 may be received as well as an area for receiving therein the nut (not shown) which is threadedly engaged on the latter referenced end of the shaft 54.

With futher reference to FIG. 4 of the drawings, it will be understood therefrom that the second portion 58 of the shaft 54 is provided intermediate its ends with a shoulder (not shown). The latter shoulder may be formed through the use of any suitable conventional techniques such as for example, by turning down some of the length of the second portion 58 of the shaft 54 so as to provide the latter portion 58 of the shaft 54 with a reduced diameter along some of its length. The aforedescribed shoulder (not shown) functions as a stop in a manner yet to be described. A washer 62 is preferably positioned on the second portion 58 of the shaft 54 so as to be disposed in engagement with the aforedescribed shoulder (not shown) whereby the latter limits the extent to which the washer 62 can move along the second portion 58 of the shaft 54. Adjacent thereto, the coil support 64 is mounted on that part of the second portion 58 of the shaft 54 which is provided with a reduced diameter. More particularly, the coil support 64 is mounted on the second portion 58 of the shaft 54 so that the latter extends through a suitably dimensioned hole (not shown) formed at the center of the coil support 64 and extending the entire length thereof. With the coil support 64 so mounted, the major axis thereof lies in a plane which is parallel to the plane of the principal axis of the base 52. For purposes of retaining the coil support 64 positioned on the second portion 58 of the shaft 54, means comprising a washer 66 and a cap nut 68 are preferably employed. More particularly, after the coil support 64 has been placed on the second portion 58 of the shaft 54, the washer 66 is positioned on the free end of the second portion 58 and thereafter the cap nut 68 is threadedly engaged on the threaded end of the second portion 58 of the shaft 54 and is tightened thereon.

Continuing with the description of the nature of the construction of the fixture 50, the latter as depicted in FIG. 4 of the drawings is preferably provided with an elongated spring member 70. The latter spring member 70 has one of its ends fixedly mounted to the periphery of the coil support 54 by means of a suitable conventional fastener such as for example, by means of a pin 72. The other end of the spring member 70 is preferably provided adjacent its other end with a slot (not shown). The latter slot is suitably dimensioned so as to permit the shaft of a pin 74 to be passed therethrough and so as to also permit relative movement to occur between the pin 74 and the spring member 70. In addition, the width dimension of the slot (not shown) is such that the diameter of the head of the pin 74 is greater than the width of the slot (not shown) whereby to prevent the head of the pin 74 and more particularly the entire pin 74 from being passed completely through the aforereferenced slot.

The spring member 70 is employed for purposes of imparting a biasing force to the side wall of the hollow interior of a coil (not shown) of solder wire. More specifically, in order to position a coil (not shown) of solder wire on the coil support 64 the spring member 70 must be compressed to some extent relative to the coil support 64. This occurs as a result of the engagement of the spring member 70 with the side wall which defines the hole formed through the center of a coil (not shown) of solder wire. The latter movement of the spring member 70 is made possible by means of the aforedescribed slot (not shown) and pin 74 construction. Consequently, the spring member 70 functions as an inhibiting means operable to inhibit relative movement between the coil (not shown) of solder wire and the coil support 64 on which the former is mounted. On the other hand, the coil support 64 is free to rotate relative to the second portion 58 of the shaft 54.

The manner of use of the fixture 50 is similar to that described hereinabove for the fixture 10. Namely, after a coil (not shown) of solder wire has been positioned on the coil support 64 in the aforedescribed manner, to obtain solder wire from the coil the free end of the solder wire is pulled outwardly away from the coil. As a result, the coil (not shown) and the coil support 64 rotate relative to the second portion 58 of the shaft 54. This rotation of the coil (not shown) is made to continue until a desired length of solder wire has been uncoiled. As the solder wire is consumed, the worker simply continues to uncoil the solder wire as he needs it. When he is finished soldering, the worker merely recoils the free end of the solder wire which remains unused back on the coil. It can therefore be seen that through the use of the fixture 50 like the fixture 10, the danger that misplacement of solder wire will occur has been obviated. In addition, the only portion of the solder wire which need be wasted is a small portion of the inner end of the solder wire wound on the coil thereby enabling considerable savings in solder wire to be achieved.

Completing the description of the construction of the fixture 50, the base 52 thereof as illustrated in FIG. 4 of the drawings preferably is provided with a plurality of holes 76. The latter holes 76 extend completely through the base 52 and are provided for purposes of receiving therein conventional threaded fasteners (not shown). More particularly, in the event that it is desired to detachably secure the fixture 50 on a suitable surface such as a workbench, etc., this may be accomplished through the use of the aforedescribed fasteners positioned in the holes 76. It will be noted with reference to FIG. 4 of the drawings, that the holes 76 are preferably countersunk whereby to present a substantially planar surface when a fastener (not shown) is positioned therein.

Although two embodiments of a fixture particularly suited for use to support a coil of solder wire constructed in accordance with the present invention have been shown in the drawings and described hereinabove, it is to be understood nevertheless that other modifications in the construction thereof may be made thereto by those skilled in the art without departing from the essence of the invention. In this connection, some of the modifications which can be made in the fixtures 10 and 50 have been alluded to hereinabove while others will become readily apparent to those skilled in the art when exposed to the present description and illustration of the construction of the fixture 10 and the fixture 50. For example, as described hereinabove the shaft 18 of the fixture 10 need not be formed as a separate member embodying portions of varying diameters. Rather, the portions 22 and 26 could be formed as separate elements independent of the shaft 18. In addition, the shaft 18 could be mounted on the base 12 through some means other than through the use of the nut 20 such as for example, by being welded thereto, etc. Moreover, means other than the washer 40 and cap nut 42 could be employed for retaining the coil support 36 positioned on the shaft 18. Although not depicted in the drawings, it is to be understood that the fixture 10 if so desired could be provided with some form of means such as for example, a friction brake operable to prevent the coil support 36 and the coil 44 of solder wire 46 carried thereon from freewheeling as solder wire is unwound from the coil 44. Similar modifications could be made in the construction of the fixture 50 without departing from the essence of the invention. In this connection, the shaft 54 could be formed in two parts, i.e., portions 56 and 58 could each consist of a separate element each having one end thereof suitably joined together. In addition, the shoulder formed intermediate the ends of the second portion 58 of the shaft 54 could be formed through the mounting of a separate member having an enlarged diameter on the second portion 58. Also, some means other than the spring member 70 could be employed for purposes of inhibiting relative movement between the coil support 64 and a coil of solder wire supported thereon.

Thus, it can be seen that the present invention provides a novel and improved fixture which is particularly suited to function as a support for a coil of solder wire while solder connections are being made employing the solder wire on the coil. Moreover, in accord with the present invention such a fixture for a coil of solder wire is provided which facilitates the task of the production worker in the soldering of small components and printed circuit boards. The fixture for a coil of solder wire of the present invention is operable to help lessen the fatigue of the production worker making soldering connections. Furthermore, such a fixture for a coil of solder wire has been provided in accord with the present invention which is operable to help obviate the misplacement of solder wire during production. Also, in accordance with the present invention such a fixture for a coil of solder wire has been provided which in savings of solder wire alone provided thereby is capable of paying for itself in a relatively short time. Finally, the fixture for a coil of solder wire in accord with the present invention is inexpensive to manufacture, compact in construction, and is designed for portability.

I claim:

1. A fixture particularly suited as a support for a holder of material comprising:

a. a base operable for supporting the fixture on a supporting surface;

b. a shaft having at least one end thereof threaded and having shoulder means formed intermediate the ends thereof operable to provide said shaft with a portion having a differing diameter;

c. mounting means fixedly mounting the other end of said shaft on said base at least a portion of said shaft lying in a plane perpendicular to the principal plane of said base;

d. a coil support operable for receiving a holder of material thereon supported on said shaft for rotation relative thereto at a location along the length thereof determined by said shoulder means; and e. retaining means detachably mounted at said one end of said shaft for retaining said coil support rotatably mounted on said shaft, said retaining means comprising a washer positioned on said shaft in engagement with one end of said coil support and a cap nut tightened on said one end of said shaft in threaded engagement therewith.

2. The fixture as set forth in claim 1 wherein said base is of polygonal configuration having an opening formed therethrough at the center thereof terminating in a recessed portion formed in the bottom surface of said base having a larger dimension than said opening.

3. The fixture as set forth in claim 2 wherein said one end of said shaft is threaded and is received in said base, and said mounting means includes a nut tightened on said one end of said shaft in threaded engagement therewith wherein said one end of said shaft and said nut are positioned within said recessed portion formed in said base.

4. The fixture as set forth in claim 3 wherein said shaft comprises an elongated member the entire length of which lies in a plane perpendicular to the plane of the principal axis of said base, and said shoulder means comprises a first shoulder and a second shoulder formed in spaced relation relative to each other intermediate the ends of said shaft.

5. The fixture as set forth in claim 4 further comprising bearing means positioned on said shaft in engagement with said first shoulder and plate means positioned on said shaft in engagement with said bearing means wherein said bearing means provides a bearing surface for said plate means, and wherein said second shoulder is operable as a stop to limit the extent to which said one end of said shaft projects through said opening in said base.

6. The fixture as set forth in claim 1 wherein said shaft includes a first portion and a second portion joined integrally together so as to extend at right angles to each other and with the free end of said first portion comprising said one end of said shaft mounted to said base wherein said first portion of said shaft lies in a plane perpendicular to the principal plane of said base and said second portion of said shaft lies in a plane parallel to the principal plane of said base, said shoulder means being formed on said second portion of said shaft, and said coil support being supported on said second portion of said shaft at a point along the length thereof determined by said shoulder means.

7. The fixture as set forth in claim 6 wherein a spring member is mounted on said coil support operable for inhibiting relative movement between said coil support and a holder of material positioned thereon.

* * * * *